United States Patent
Nakagawa

(10) Patent No.: US 10,437,139 B2
(45) Date of Patent: Oct. 8, 2019

(54) PROJECTOR APPARATUS, PROJECTION METHOD, AND STORAGE MEDIUM

(71) Applicant: CASIO COMPUTER CO., LTD, Tokyo (JP)

(72) Inventor: Atsushi Nakagawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/982,767

(22) Filed: May 17, 2018

(65) Prior Publication Data
US 2018/0367770 A1 Dec. 20, 2018

(30) Foreign Application Priority Data

Jun. 20, 2017 (JP) .................. 2017-120588
Sep. 25, 2017 (JP) .................. 2017-183738

(51) Int. Cl.
| | | |
|---|---|---|
| G03B 21/00 | (2006.01) | |
| G03B 21/14 | (2006.01) | |
| H04N 9/31 | (2006.01) | |
| H04N 5/74 | (2006.01) | |
| G06T 3/00 | (2006.01) | |
| G03B 17/48 | (2006.01) | |

(Continued)

(52) U.S. Cl.
CPC ............ *G03B 21/147* (2013.01); *G03B 17/48* (2013.01); *G03B 21/00* (2013.01); *G06T 3/00* (2013.01); *G06T 5/006* (2013.01); *H04N 5/7416* (2013.01); *H04N 7/0122* (2013.01); *H04N 9/3182* (2013.01); *H04N 9/3185* (2013.01); *H04N 9/3194* (2013.01)

(58) Field of Classification Search
CPC .. H04N 9/3185; H04N 9/3182; H04N 9/3194; H04N 5/7416; H04N 7/0122; G06T 3/00; G06T 5/006; G03B 17/48; G03B 21/00; G03B 21/147
See application file for complete search history.

(56) References Cited

U.S. PATENT DOCUMENTS

| | | | | |
|---|---|---|---|---|
| 2005/0024597 A1* | 2/2005 | Kubo | ............. | H04N 5/74 353/69 |
| 2012/0105813 A1* | 5/2012 | Todoroki | ............. | H04N 9/3185 353/69 |

(Continued)

FOREIGN PATENT DOCUMENTS

| | | |
|---|---|---|
| JP | 2003018502 A | 1/2003 |
| JP | 2006201673 A | 8/2006 |

(Continued)

*Primary Examiner* — Sultan Chowdhury
*Assistant Examiner* — Magda Cruz
(74) *Attorney, Agent, or Firm* — Fitch, Even, Tabin & Flannery LLP

(57) ABSTRACT

A projector apparatus includes a projection unit that projects an image, a projection direction variable unit configured to mechanically change a direction of the image to be projected by the projection unit, an acquiring unit that acquires the image projected by the projection unit onto a target of projection, and a control unit that determines a direction of projection to be changed by the projection direction variable unit, based on information on a plurality of projection images acquired by the acquiring unit.

20 Claims, 10 Drawing Sheets

(51) Int. Cl.
*G06T 5/00* (2006.01)
*H04N 7/01* (2006.01)

(56) References Cited

U.S. PATENT DOCUMENTS

| | | | | |
|---|---|---|---|---|
| 2014/0285776 A1* | 9/2014 | Inoue | ................... | H04N 9/3185 |
| | | | | 353/69 |
| 2014/0285777 A1* | 9/2014 | Inoue | ................... | H04N 9/3185 |
| | | | | 353/70 |
| 2014/0285778 A1* | 9/2014 | Inoue | ................... | H04N 9/3185 |
| | | | | 353/70 |
| 2016/0188123 A1* | 6/2016 | Fujiune | ................ | G03B 21/145 |
| | | | | 345/156 |
| 2017/0264873 A1* | 9/2017 | Muramatsu | ........... | H04N 9/3185 |
| 2017/0329208 A1* | 11/2017 | Takahashi | ................ | G09G 5/00 |

FOREIGN PATENT DOCUMENTS

| | | |
|---|---|---|
| JP | 2015144344 A | 8/2015 |
| WO | 2007072695 A1 | 6/2007 |

\* cited by examiner

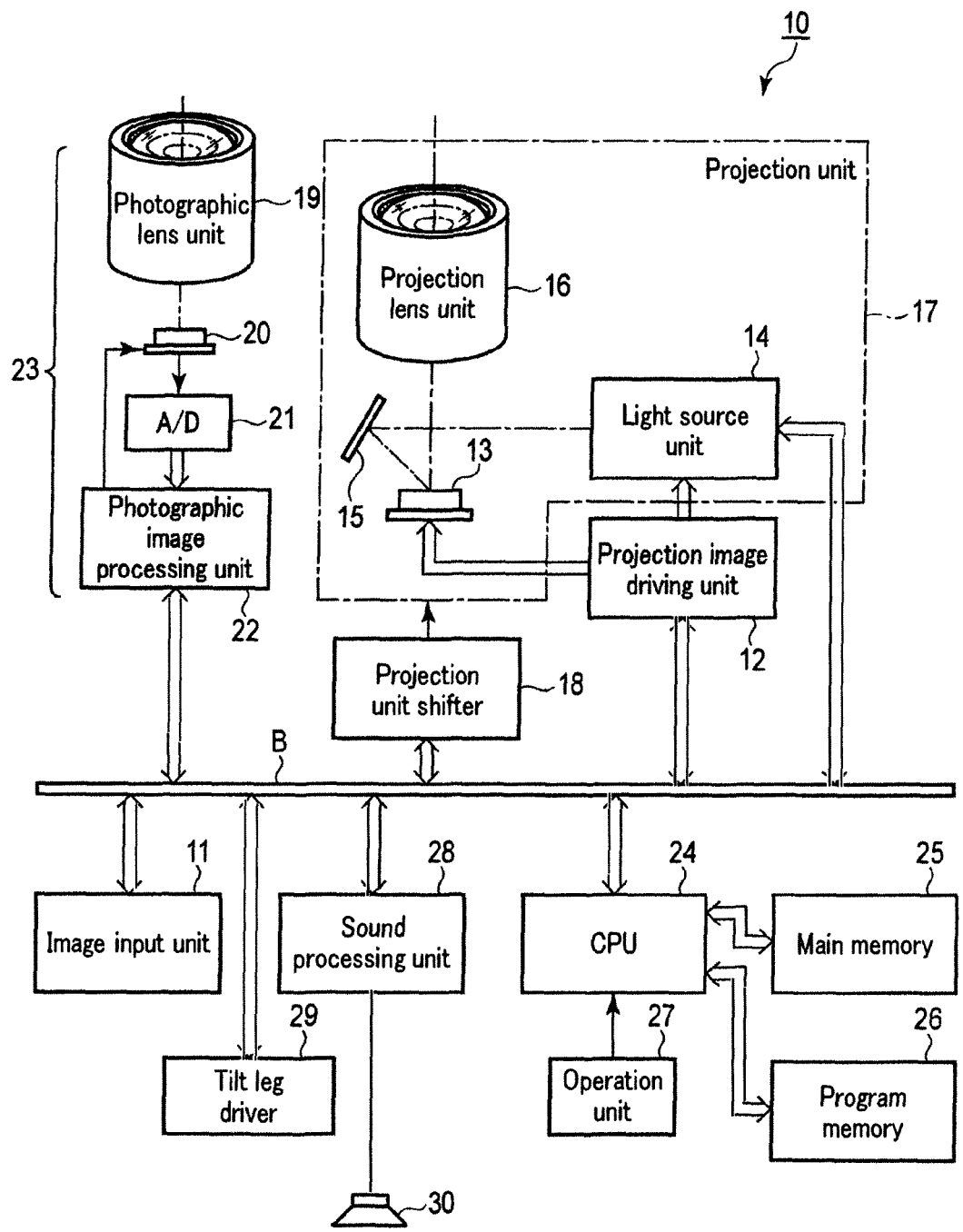
F I G. 1

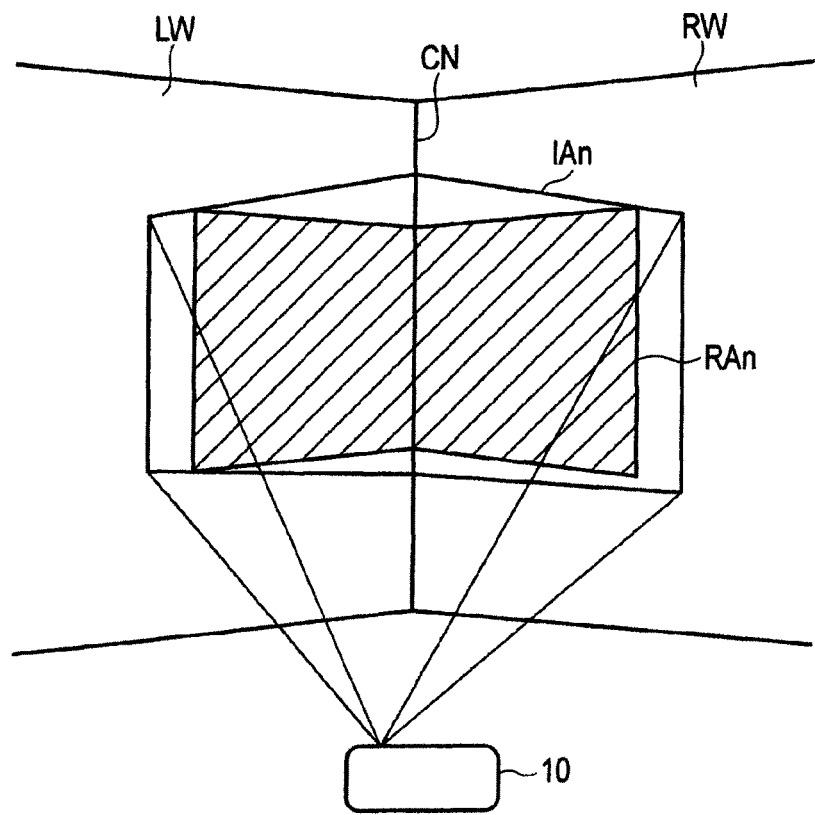
F I G. 5

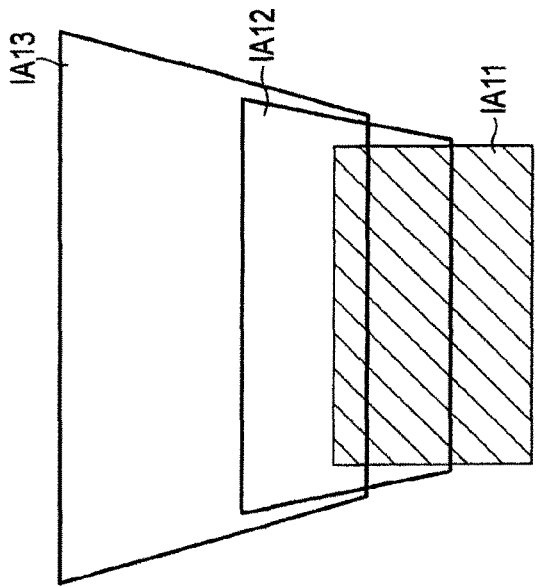
FIG. 8A
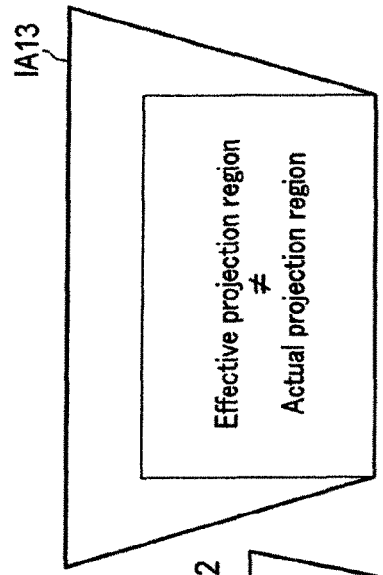
FIG. 8D
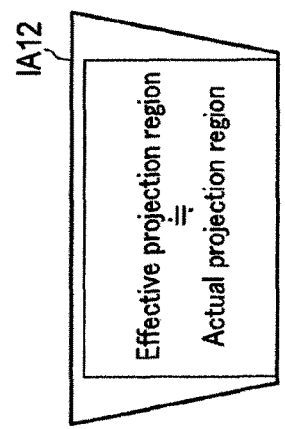
FIG. 8C
FIG. 8B

PROJECTOR APPARATUS, PROJECTION METHOD, AND STORAGE MEDIUM

CROSS-REFERENCE TO RELATED APPLICATIONS

This application is based upon and claims the benefit of priority from Japanese Patent Applications No. 2017-120588, filed Jun. 20, 2017; and No. 2017-183738, filed Sep. 25, 2017, the entire contents of all of which are incorporated herein by reference.

BACKGROUND OF THE INVENTION

1. Field of the Invention

The present invention relates to a projector apparatus, a projection method, and a storage medium.

2. Description of the Related Art

Jpn. Pat. Appln. KOKAI Publication No. 2003-018502 proposes a technique of a projector-type display apparatus that detects a lens shift amount of a projection lens and performs an optimum unevenness correction on a projection screen, thereby acquiring a high-quality projection image.

The technique disclosed in Jpn. Pat. Appln. KOKAI Publication No. 2003-018502 is proposed to correct for unevenness in color and illuminance caused by a position gap, for example, of components of a projection optical system in the projector-type display apparatus having a lens shift function that changes the direction of the optical axis of the projection lens relative to the optical axis of the liquid crystal panel that displays an image to be projected. In this technique, correction data is created for each partial region of the image to be projected.

When an environment is assumed in which projection is performed on a wall surface or a curtain of an ordinary house as a target of projection, instead of a dedicated screen, the surface on which an image is projected is not necessarily a white, flat, and smooth surface. When an image is projected onto such a patterned or uneven surface, for example, the quality of the projection image may be greatly reduced by the effect of the surface that is to be the target of projection. The technique disclosed in the above-described patent literature does not take into consideration such environmental-related matters on the side of the target of projection.

The present invention has been made in consideration of the above-described circumstances, and an object of the present invention is to provide a projector apparatus, a projection method, and a storage medium, capable of setting an environment in which an image of a quality as high as possible is projected, in consideration of the effect of the surface that is to be the target of projection.

SUMMARY OF THE INVENTION

According to one aspect of the present invention, there is provided a projector apparatus comprising: a projection unit that projects an image; a projection direction variable unit configured to mechanically change a direction of the image to be projected by the projection unit; an acquiring unit that acquires the image projected by the projection unit onto a target of projection; and a control unit that determines a direction of projection to be changed by the projection direction variable unit, based on information on a plurality of projection images acquired by the acquiring unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram mainly showing a functional configuration of electronic circuits of a projector according to a first embodiment of the present invention;

FIG. 5 illustrates a case where an effective projection region and an actual projection region are set, according to the first operation example of the embodiment;

FIGS. 8A, 8B, 8C, and 8D show effective projection regions at respective tilt angles, as compared to the case where a rectangular actual projection region is set, according to the second operation example of the present embodiment;

DETAILED DESCRIPTION OF THE INVENTION

Figures 2, 3:
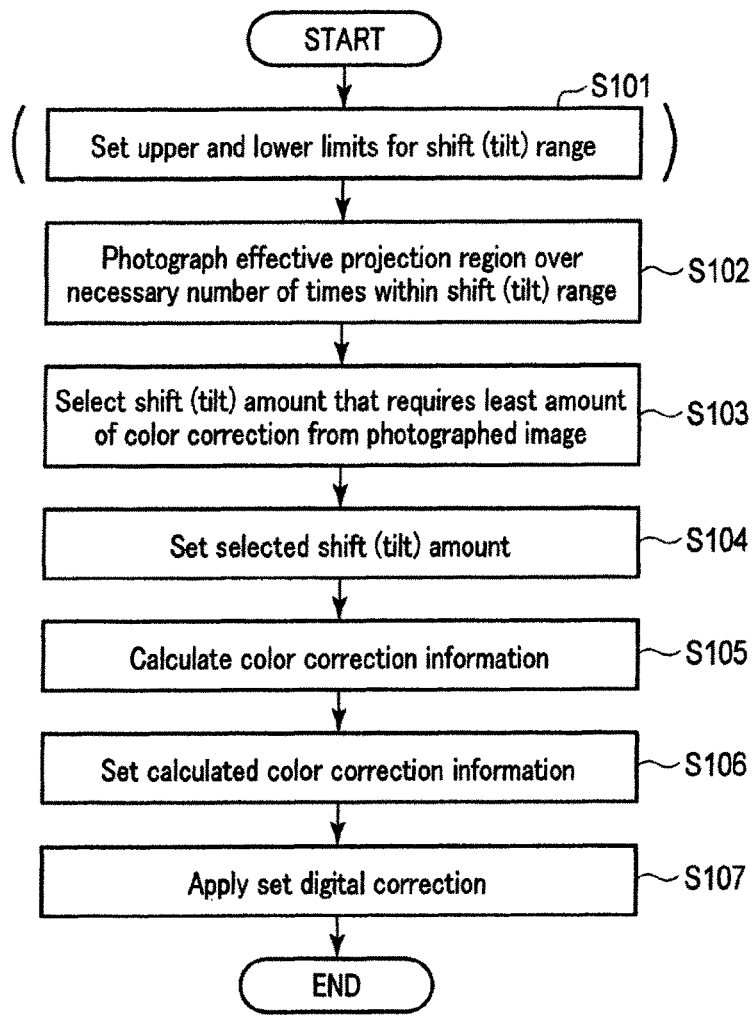
FIG. 2 is a flowchart showing processing of initial setting prior to a projection operation according to the embodiment.
FIG. 3 illustrates a shift range covered by a projection unit shifter according to a first operation example of the embodiment.

Hereinafter, an embodiment of the present invention applied to a projector will be explained in detail with reference to the accompanying drawings.

[Configuration]

FIG. 1 is a block diagram mainly showing functional configuration of electronic circuits of a projector 10 according to the present embodiment. In the drawing, an image input unit 11 is configured by, for example, a pin-jack (RCA) type video input terminal, a D-sub15 type RGB input terminal, a High-Definition Multimedia Interface (HDMI) (registered trademark) terminal, a Universal Serial Bus (USB) terminal, etc. An analogue or digital image signal in various standards that is input to the image input unit 11, or stored in a USB memory and selectively read therefrom, is sent to a projection image driving unit 12 via a bus B after being digitized in the image input unit 11 as needed.

In accordance with the sent image data, the projection image driving unit 12 drives a micromirror element 13, which is a display element, by time division driving at a frame rate corresponding to a predetermined format, for example, at a higher rate calculated by multiplying a division number of color components and the number of display gradation levels by 120 frames per second when the frame rate of the input image data is 60 Hz, for example.

The micromirror element 13 quickly toggles on and off each of a plurality of microscopic mirrors arranged in an array of, for example, 1280×960 pixels to change the tilt angle for a display operation, thereby forming an optical image using the light reflected thereby.

On the other hand, light in primary colors (R, G, and B) is cyclically emitted from a light source unit 14 in a time-division manner. The light source unit 14 has LEDs, which are semiconductor light-emitting elements, and repeatedly emits the R, G, and B primary color light in a time-division manner. The LED of the light source unit 14 may include a laser diode (LD) or an organic EL element as an LED in a broad sense. The primary color light from the light source unit 14 is completely reflected off a mirror 15, and is applied onto the micromirror element 13.

An optical image is formed by the reflection light at the micromirror element 13, and the formed optical image is projected to the outside via a projection lens unit 16 for display.

The projection lens unit 16 includes, in a lens optical system provided therein, a focus lens for moving the focal position and a zoom lens for changing a zoom (projection) viewing angle.

The micromirror element 13, the light source unit 14, the mirror 15, and the projection lens unit 16 constitute a projection unit 17, in which optical members are integrally provided in an internal housing. A projection unit shifter (projection direction variable unit) 18 including a stepping motor, a driver circuit thereof, and a gear mechanism that transmits rotary driving of the motor are provided for the projection unit 17.

By mechanically driving the projection unit 17 using a projection unit shifter 18, the direction of the projection light emitted by the projection lens unit 16 can be shifted within a range along the vertical direction in a state in which a housing of the projector 10 is horizontally placed, for example.

In the present embodiment, a photographing (acquiring) unit 23 that photographs a direction of projection by the projection lens unit 16 is provided. The photographing unit 23 includes a photographic lens unit 19. The photographic lens unit 19 includes a zoom lens for changing the photographic viewing angle and a focus lens for moving the focal position. The photographic lens unit 19 has a photographic viewing angle wider than a projection viewing angle that is emitted when the projection lens unit 16 is set to have the widest angle, in such a manner that an image projected by the projection unit 17 can be photographed while covering the shift range of the direction of projection. An external optical image that enters the photographic lens unit 19 is formed on a CMOS image sensor, which is a solid state image sensor, or on an image sensor 20 such as a CCD used for an industrial camera, for example.

An image signal acquired by the image formation on the image sensor 20 is digitized by an A/D converter 21, and then sent to a photographic image processing unit 22.

The photographic image processing unit 22 scans and drives the image sensor 20 to execute a photographic operation, extracts a projection image region by image recognition processing such as contour extraction from the image data acquired by the photography, and acquires a distance distribution and a color distribution on the basis of a focus lens in-focus position in the projection image region.

All of the above-described operations of the circuits are controlled by the CPU (control unit) 24. The CPU 24 is directly connected to a main memory 25 and a program memory 26. The main memory 25 is configured by, for example, an SRAM, and functions as a work memory of the CPU 24. The program memory 26 is configured by an electrically-rewritable, non-volatile memory, such as a flash ROM, and stores various kinds of fixed data, such as operation programs to be executed by the CPU 24 and On Screen Display (OSD) images to be superimposed on a base image.

The CPU 24 reads the operation programs, the fixed data, etc. stored in the program memory 26, and executes the programs after loading and storing them in the main memory 25, thereby integrally controlling the projector 10.

The CPU 24 executes various projection operations in response to an operation signal from an operation unit 27. The operation unit 27 includes a light receiving unit for receiving an infrared modulation signal from an operation key included in a main body housing of the projector 10, or from a remote controller (not shown in the drawings) dedicated for the projector 10, and accepts a key operation signal and sends a signal corresponding to the accepted key operation signal to the CPU 24.

The CPU 24 is also connected to a sound processing unit 28 and a tilt leg driver 29 via the bus B.

The sound processing unit 28 comprises a sound source circuit, such as a PCM sound source, converts a sound signal given at the time of the projection operation into an analogue form, and drives the speaker unit 30 to emit sound or generate a beep, for example, as needed.

The tilt leg driver 29 drives a motor (not shown in the drawings) for changing the length of a pair of legs provided at the front end of a lower surface of the housing of the projector 10 to increase or decrease the length of the legs.

First Operation Example

Next, a first operation example according to the present embodiment will be explained.

Herein, an explanation will be given about the operation at the time of initial setting based on shift amount adjustment before an actual projection operation is started by the projector 10. At the initial setting, the direction of projection by the projection unit 17 is shifted upward and downward within a predetermined range by the projection unit shifter 18, and a position is selected that requires the least amount of color correction and that allows an image to be projected onto a surface that is to be the target of projection, without causing a feeling of strangeness, from the shift range.

FIG. 2 is a flowchart showing processing performed by the CPU 24. At the start, the CPU 24 accepts an operation made by a key operation from the operation unit 27 for the case where upper and lower limit positions are set for the shift range covered by the projection unit shifter 18 (step S101).

In this case, the projection unit 17 projects an all-white image on the basis of a zoom projection viewing angle set at this point in time. The user of the projector 10 performs an operation in accordance with the situation, for example, of the surface that is to be the target of projection, in such a manner that the upper limit value of the shift range can be recognized by the side of the projector 10. For example, when there is an obstacle such as an indoor unit of an air conditioner in the vicinity of the upper limit position of the shift, the user lowers the position of the projection image in advance, so as to avoid the obstacle.

The processing at step S101 may be omitted if unnecessary.

Subsequently, the CPU 24 causes the photographing unit 23 to photograph an effective projection region over a necessary number of times, within the shift range covered by the projection unit shifter 18 (step S102).

FIG. 3 illustrates a shift range covered by the projection unit shifter 18. In this embodiment, let us assume that the shift position can be selected and set in a non-stepwise manner within the range between an effective projection region IA1 that is shifted upward (+) by 40%, as shown in (A) of FIG. 3, and an effective projection region IA2 that is shifted downward (-) by 40%, as shown in (C) of FIG. 3, relative to an effective projection region IA0 that is the standard for the zero shift amount, as shown in (B) of FIG. 3.

When the maximum amount of shift by the projection unit shifter 18 is equal to or less than ±50%, the entire shift range can be covered by performing photography twice. On the other hand, when the shift amount exceeds ±50%, photography needs to be performed three or more times to cover the entire shift range.

Figure 4:
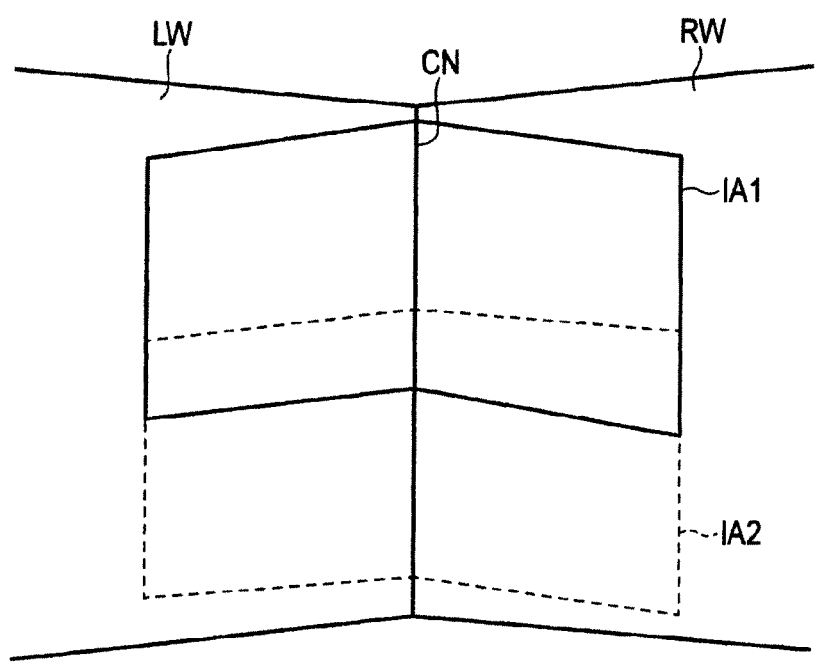
FIG. 4 illustrates a projection environment according to the first operation example of the embodiment.

FIG. 4 illustrates a case where the effective projection region by the projector 10 is shifted with a corner portion CN interposed between a left wall LW and a right wall RW at the center. In this case, assuming that the maximum amount of upward and downward shifts is ±40%, as described above, an effective projection region IA1 that is shifted upward by 40% and an effective projection region IA2 that is shifted downward by 40% are shown.

Based on the results of photography of the effective projection regions IA1 and IA2 that cover the entire shift range, the CPU 24 selects a shift amount of an effective projection region corresponding to an image that requires the least amount of color correction as a region in which an image can be projected onto the surface that is to be the target of projection, without causing a feeling of strangeness, by processing such as comparison of histograms of RGB components in the photographed image data (step S103).

The CPU 24 sets image projection with the selected shift amount in the projection unit shifter 18 (step S104). Next, the CPU 24 calculates color correction information of each pixel in such a manner that the projection image in the effective projection region cancels out the effect of the wall surface, etc. that is to be the target of projection, such as color and pattern (step S105), and sets the calculated color correction information in the projection image driving unit 12 (step S106).

Furthermore, the CPU 24 performs settings on digital correction such as automatic trapezoid correction, including reduction of the range of the image to be displayed on the micromirror element 13, which is set in advance at this point in time (step S107).

In the projection environment shown in FIG. 4, for example, the distance from the projection lens unit 16 of the projector 10 to the wall surface that is to be the target of projection is not constant. In this case, the projection distance becomes the shortest at the right and left ends, and becomes the longest at the corner portion CN at the approximate center.

Accordingly, when a rectangular image is projected by the projector 10, a distorted hexagonal image that is largest at the corner portion CN is projected. Thus, the CPU 24 recognizes the effective projection region based on the image photographed by the photographing unit 23, and sets the shape of the image region to be displayed on the micromirror element 13 to be changed into a shape obtained by combining two trapezoids that have the corner portion CN as a common upper side and that have the right and left sides of the rectangle as the bottom sides. Thereby, an actual projection region in the effective projection region can be set.

FIG. 5 illustrates a case where an actual projection region RAn is set in the effective projection region IAn with the selected shift amount. As described above, the effective projection region IAn is in a distorted hexagonal shape that is largest at the corner portion CN at the approximate center.

Thus, by setting an actual projection region RAn by composite trapezoid correction in the shape obtained by combining two trapezoids that have the corner portion CN as the common upper side and that have the right and left sides of the rectangle as the lower sides. It is thus possible for the user of the projector 10 to view the projection image in the apparently correct rectangular shape.

The processing of the initial setting in FIG. 2 is completed in the above manner, and proceeds to the actual projection operation using a given input image.

In the first embodiment, an explanation has been given based on the assumption that the projection unit shifter 18 can shift the direction of projection by the projection unit 17 upward and downward. However, the direction of projection may be shifted rightward and leftward, instead of the upward and downward directions.

In this case, when the maximum shift amount in each of the rightward and leftward directions is equal to or less than ±50% (where one of the rightward and leftward directions is set as + and the other is set as -), for example, the entire shift range, including the upward and downward shifts, can be covered by performing photography four times. When the shift amounts in both of the upward and downward directions and the rightward and leftward directions are greater than ±50%, photography needs to be performed nine or more times to cover the entire shift range.

Second Operation Example

Next, a second operation example of the above-described embodiment will be explained.

Herein, an explanation will be given about the operation at the time of initial setting based on a tilt amount adjustment before an actual projection operation is started by the projector 10. At the initial setting, the tilt leg driver 29 causes tilt legs of the projector 10 to extend and contract within a predetermined range, allowing an elevation angle (tilt angle) of projection light emitted from the projection lens unit 16 to be variably set. Thereby, a position is selected that requires the least amount of color correction and that allows an image to be projected onto the surface that is to be the target of projection, without causing a feeling of strangeness, from the tilt range.

At the start of the flowchart shown in FIG. 2, the CPU 24 accepts an operation made by a key operation from the operation unit 27 for the case where upper and lower limit positions are set for the tilt range covered by the tilt leg driver 29 (step S101).

In this case, the projection unit 17 projects an all-white image on the basis of a zoom projection viewing angle set at this point in time. The user of the projector 10 performs an operation in accordance with the situation, for example, of the surface that is to be the target of projection, in such a manner that the upper limit value of the tilt range can be recognized by the side of the projector 10. For example, when there is an obstacle such as an indoor unit of an air conditioner in the vicinity of the upper limit position of the tilt, the user increases the tilt angle in advance until the position of the projection region almost reaches the obstacle, so as to avoid the obstacle.

The processing at step S101 may be omitted if unnecessary.

Subsequently, the CPU 24 causes the photographing unit 23 to photograph an effective projection region over a necessary number of times, within the tilt range covered by the tilt leg driver 29 (step S102).

Figure 6A:
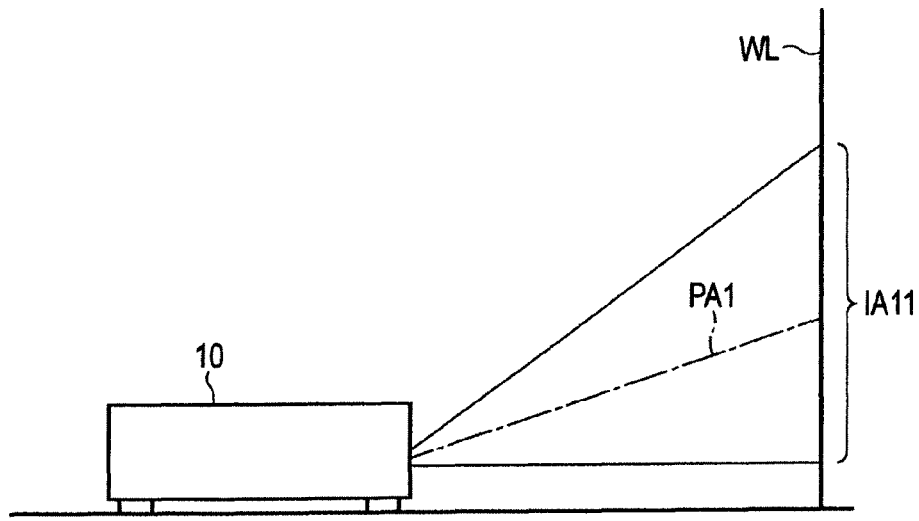
FIGS. 6A and 6B show a change in tilt angle and projection region in the case where a projector is placed to face an upright wall surface, according to a second operation example of the embodiment.
Figure 6B:
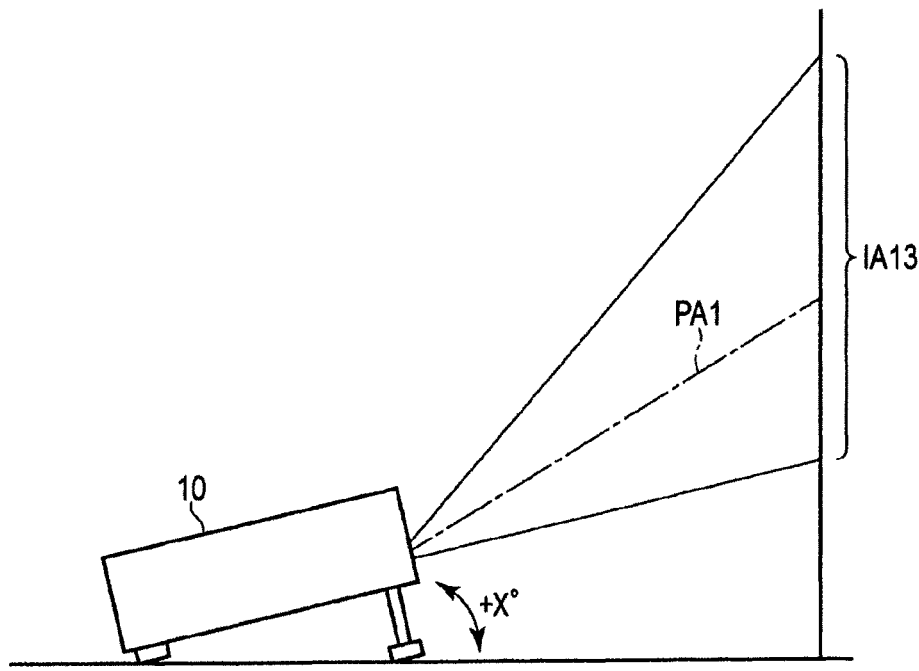

FIGS. 6A and 6B show a change in tilt angle and projection region in the case where the projector 10 is placed to face an upright wall surface WL.

FIG. 6A illustrates a projection state in which the tilt angle is set to 0°, in such a manner that the length of the tilt legs of the projector 10 becomes the shortest. A projection optical axis PA1 is set to have an offset angle toward an upward direction relative to the plane of the top plate of the housing of the projector 10, as shown by the effective projection region IA11 and the projection optical axis PA1 at this point in time. In this state, however, correction settings are made by an optical system including the projection lens unit 16, in such a manner that the effective projection region IA11 has a preset aspect ratio, for example, a precise 4:3 rectangle.

By this offset angle setting, even when the projector 10 is arranged on a floor surface, the effective projection region IA11 can be set on the wall surface WL that is orthogonal to the floor plane.

FIG. 6B illustrates a projection state at the maximum tilt angle X°, in which the tilt leg driver 29 performs driving in such a manner that the length of the tilt legs of the projector 10 becomes the longest. As shown by the effective projection region IA13 and the projection optical axis PA1 at this point in time, the entire projection region is moved upward, and the projection distance from the projector 10 increases, in comparison to the case where the length of the tilt legs of the projector 10 is the shortest. Thus, the effective projection region IA13 is wider than the effective projection region IA11.

In addition, by providing such a tilt angle, the projection region will not only increase in area as a result of the increase in height of the projection position, but also changes into a shape of an inverted trapezoid whose upper side is longer than the lower side.

Figure 7:
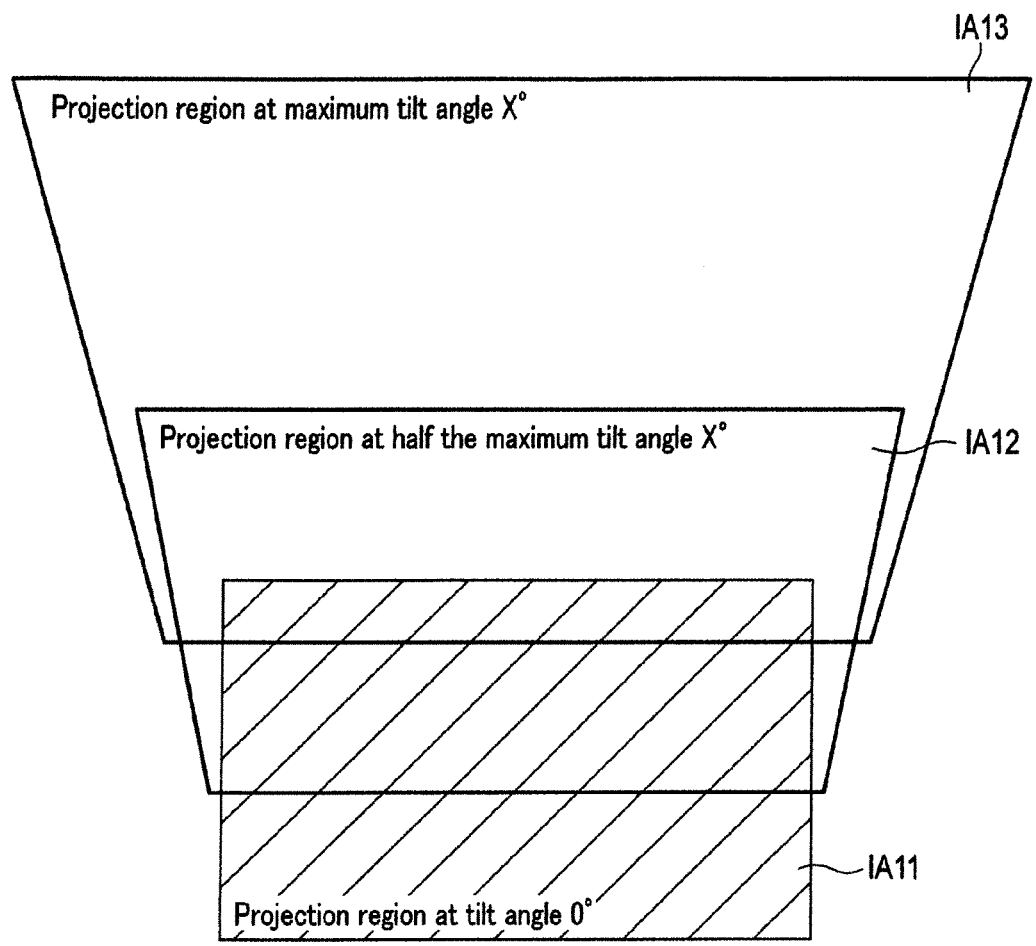
FIG. 7 illustrates positions and shapes of effective projection regions at respective tilt angles, as well as their descriptions, in an overlapped manner according to the second operation example of the embodiment.

FIG. 7 illustrates positions and shapes of effective projection regions at respective tilt angles, as well as their descriptions, in an overlapped manner. In the drawing, an effective projection region IA11 of the case where the tilt angle is 0° as shown in FIG. 6A, an effective projection region IA12 of the case where the tilt angle is X/2°, which is half the maximum tilt angle X°, and an effective projection region IA13 of the case where the tilt angle is X°, which is the maximum tilt angle, are shown.

Referring back to the flowchart of FIG. 2, an explanation will be given. As an example, let us assume that the effective projection region is photographed by the photographing unit 23 at the above-described three-stage tilt angles. Based on the results of photography of the effective projection regions at the respective tilt angles, the CPU (control unit) 24 selects a tilt angle at which an effective projection region corresponds to an image that requires the least amount of color correction as a region in which an image can be projected onto the surface that is to be the target of projection, without causing a feeling of strangeness, by processing such as a comparison of histograms of RGB components in the photographed image data (step S103).

That is, the CPU 24 causes the photographing unit 23 to photograph projection images in a plurality of directions of projection that are changed by the tilt leg driver (projection direction variable unit) 29 within a predetermined range, and determines a direction of projection to be changed by the tilt leg driver (projection direction variable unit) 29 on the basis of information on the acquired projection images.

The CPU 24 causes the tilt leg driver (projection direction variable unit) 29 to perform driving, in such a manner that an image is projected at the selected tilt angle (step S104). Next, the CPU 24 calculates color correction information of each pixel in such a manner that the projection image in the effective projection region cancels out the effect of the wall surface, etc. that is to be the target of projection, such as color and pattern (step S105). Next, the calculated color correction information is set in the projection image driving unit 12 (step S106).

Furthermore, the CPU 24 performs settings on digital correction such as automatic trapezoid correction, including reduction of the range of the image to be displayed on the micromirror element 13, which is set in advance at this point in time (step S107).

FIGS. 8A, 8B, 8C, and 8D illustrate effective projection regions at the respective three-stage tilt angles, as compared to the case where a rectangular actual projection region having a predetermined aspect ratio is set in each of the effective projection regions by automatic trapezoid correction processing. FIG. 8A illustrates positions and shapes of effective projection regions of respective tilt angles, as well as their descriptions, as in the case of FIG. 7. In the case where the tilt angle is 0°, the effective projection region IA11 has a rectangular shape with the correct aspect ratio, as shown in FIG. 8B, and the entire region will be the actual projection region.

In the case where the tilt angle is X/2°, the effective projection region IA12 is in an inverted trapezoidal shape that is made larger at the upper part in accordance with the tilt angle, as shown in FIG. 8C. Thus, when automatic trapezoid correction is performed based on the lower side to project a rectangle with the correct aspect ratio, the actual projection region will be slightly smaller in area than the effective projection region IA12, causing a decrease in resolution and brightness at an upper part in particular, of the projection image.

In the case of the maximum tilt angle X° shown in FIG. 8D, the effective projection region IA13 is in an inverted trapezoidal shape that is made even larger at the upper part in accordance with the tilt angle. Thus, when automatic trapezoid correction is performed based on the lower side to project a rectangle with the correct aspect ratio, the actual projection region will be slightly smaller in area than the effective projection region IA13, causing a further decrease in resolution and brightness at the upper part of the projection image.

The processing of the initial setting in FIG. 2 is completed in the above manner at the time when digital correction setting is performed by, for example, automatic trapezoid correction, and proceeds to the actual projection operation using a given input image.

As described above, as the tilt angle increases, the rate of decrease in resolution and brightness increases as a result of the digital correction processing such as automatic trapezoid correction. Accordingly, when a projection mode that prioritizes the image quality is selected, for example, operation control may be performed to restrict the range of tilt angles covered by the driving by the tilt leg driver 29.

Figure 9:
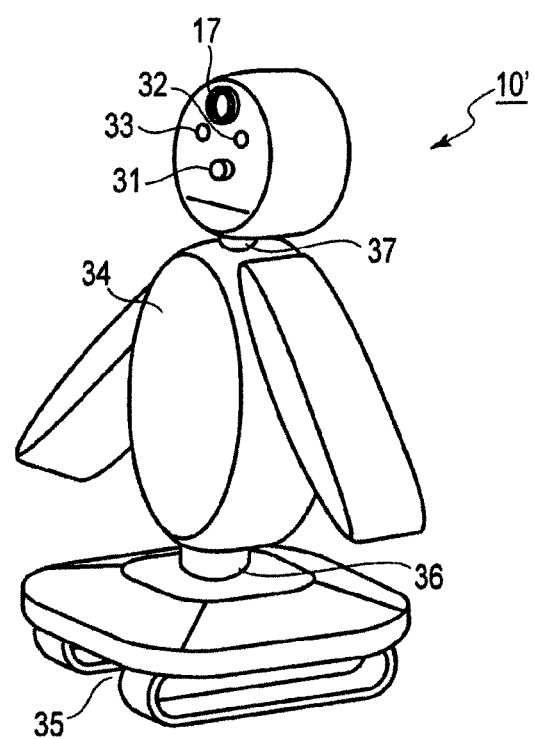
FIG. 9 shows a projector apparatus using an autonomous robot 10' according to the second embodiment of the present invention.

FIG. 9 shows a projector apparatus that uses an autonomous robot 10' according to a second embodiment of the present invention. Unlike the projector 10 according to the first embodiment, the autonomous robot 10' comprises a rotary driver 36 as a projection direction variable unit that mechanically changes the direction of an image projected by the projection unit 17. The autonomous robot 10' comprises the projection unit 17, as in the configuration of the projector 10. The autonomous robot 10' further comprises an infrared sensor 32 that detects reflected light of infrared rays to perform shape correction, and a color sensor 33 to perform color correction. When color correction is not performed and only shape correction is performed, the color sensor 33 does not need to be provided. In this case, the unevenness of the projection surface can be recognized only by the infrared sensor 32.

As the display element, DLP technology, which uses the micromirror element 13, or laser beam scanning (LBS) technology, which is preferable for miniaturized integration and does not require focus adjustment, is applicable. With the exception of the LBS technology, the DLP, the liquid crystal display (LCD), and the liquid crystal on silicon (LCOS) technologies need to consider that the distance between the projection lens unit 16 and the projection surface does not become constant when the main body of the autonomous robot 10' is a movable projector. In these technologies, the distance between the autonomous robot 10' and the projection surface needs to be measured to automatically adjust the focus. Thus, an infrared image sensor that receives infrared light reflected off the projection surface, converts the received light into an electric signal, and reads necessary information, as well as an infrared light irradiation part, is provided.

Next, the optimum focal position corresponding to the distance is processed by an image processing and computing unit 34, and the focal position of the projection lens unit 16 is electrically controlled. The image processing and computing unit 34 manages images and space information. An image that is externally input or generated by an internal image generator is reproduced, and the reproduced image is projected onto a desired projection surface via the autonomous robot 10' (projector apparatus). The main body of the autonomous robot 10' comprises a self-propelled driver 35 that can move around a predetermined space, a rotary driver 36 that rotates an upper part relative to the self-propelled driver 35, and a vertical driver that moves a part including the projection unit 17 upward and downward, or rotates the angle upward and downward.

Figure 10:
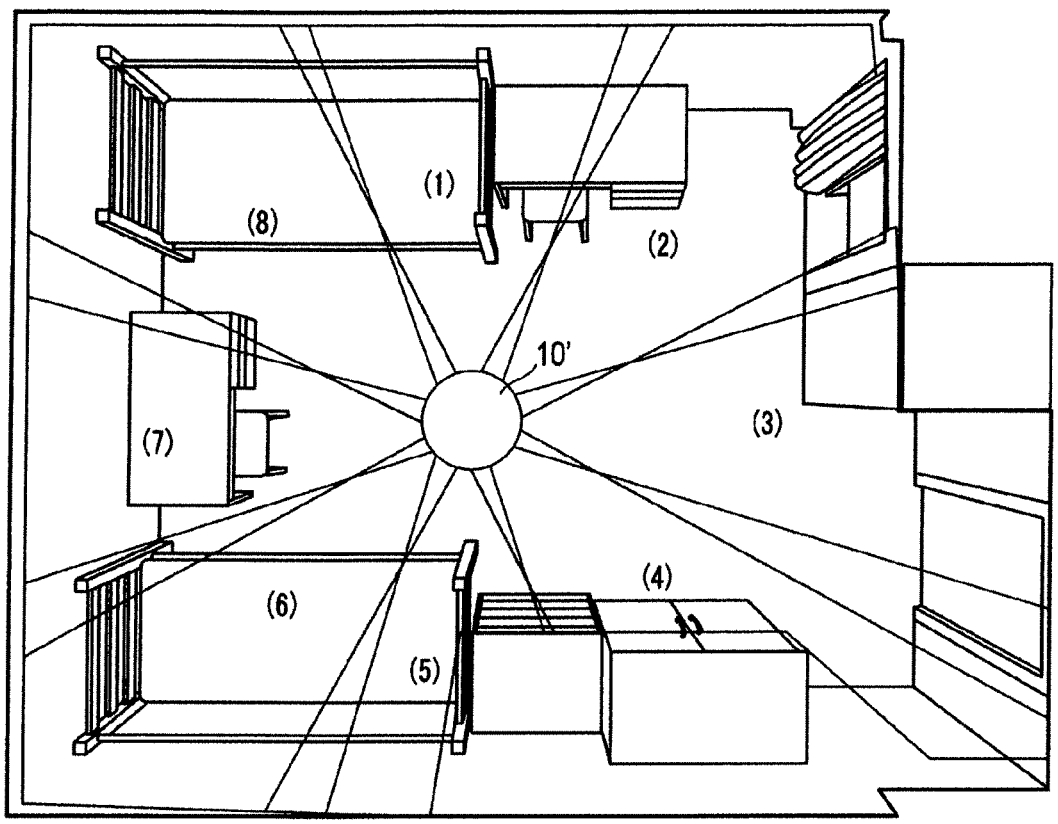
FIG. 10 shows an operation example according to the embodiment.

FIG. 10 shows a third operation example of the projector apparatus using the autonomous robot 10'. The autonomous robot 10' performs measurement by causing the projection unit 17 to perform projection and causing the photographing unit 23 to perform photography at a predetermined position every time a predetermined angle of rotation is made by the rotary driver 36, to acquire 360° information on the projection surface. For example, let us assume that the projection viewing angle is 50° in total, with each of the right viewing angle and the left viewing angle being 25°. To acquire the 360° projection surface information from a particular point, the modules of the projection unit 17 and the photographing unit 23 are measured at least eight times.

$$50° \times 8 \text{ times} = 400° > 360°$$

Specifically, light of a particular pattern, such as a striped pattern, is applied from the projection unit 17 of the autonomous robot 10', and the shape, color, etc. of the projection surface are calculated on the basis of the characteristics of the reflected image. The acquired information is recorded in the autonomous robot 10' as space information. A correction means, similar to that of the previous operation example, is used. By using a 120° wide-angle lens as the projection lens unit 16, all the surfaces of the 360° range can be recognized by performing projection and photography three times, and the optimum projection surface can be found with a small number of times.

Figure 11:
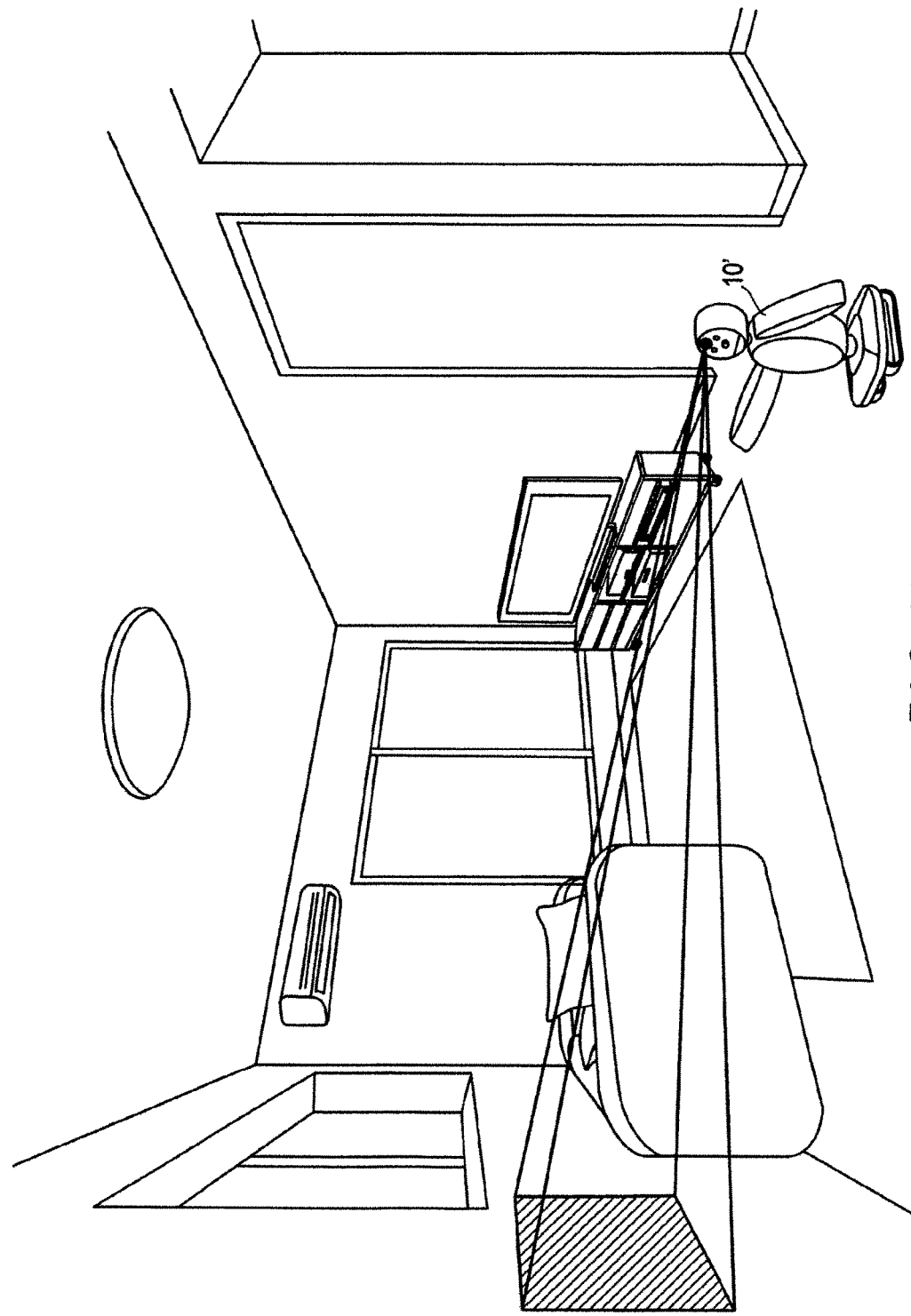
FIG. 11 shows automatic projection of an image onto an optimum projection surface selected based on a space image acquired at the time of actually projecting an image, according to the operation example of the embodiment.

FIG. 11 is a diagram that selects an optimum projection surface from an acquired space image and automatically projects an image at the time of actually projecting an image. When the part including the projection unit 17 of the autonomous robot 10' is moved upward and downward by a vertical driver 37, vertical space information can be acquired. In association with the amount of movement of the projection unit 17 of the autonomous robot 10', an optimum projection position can be determined. In addition, by using positional information based on, for example, Bluetooth (registered trademark), which is a short-distance communication technology for performing face detection, heat detection, and communications with a nearby smartphone, the position of the viewer and the orientation of the face can be recognized, thus increasing the attention effect and visibility. In the third operation example described above, by using the rotary driver 36 of the autonomous robot 10' in which the characteristics of the projection surface are recorded in advance, the whole circumference of the 360° environment can be measured by the minimum number of times, and thereby an optimum projection region can be detected.

According to the present embodiment described above, it is possible to set an environment in which an image with a quality as high as possible is projected, in consideration of the effect of the surface that is to be the target of projection.

In the above-described embodiment, a case has been explained where a direction of projection that requires the least color correction is selected. In addition thereto, an amount of reduction of the image region by digital correction set at that time may be calculated for each direction of projection, and the direction of projection that is considered to be appropriate may be automatically selected according to what is prioritized in the selected projection mode, such as the image quality, the brightness, and the size of the projection region.

Furthermore, according to the above-described embodiment, a case has been explained where automatic trapezoid correction is performed as digital correction, as illustrated in connection with the first and second operation examples. In an environment in which the projection optical axis is not orthogonal to the surface that is to be the target of projection, and an image is obliquely projected by a shift or tilt of the direction of projection, it is possible to achieve a rectangular image region having the aspect ratio of the original image that is projected, by performing correction to reliably avoid the case where the projection region becomes trapezoidal in accordance with the shift/tilt angle.

In the above-described embodiment, the acquiring unit that acquires an image projected by the projection unit 17 on a target of projection has been explained as the photographing unit 23 that photographs the image projected by the projection unit 17 onto the target of projection; however, the present invention is not limited to this configuration. An image photographed by an external photographing unit that photographs an image projected by the projection unit 17 on a target of projection may be directly acquired by an acquiring unit of the projector 10 either via a wired or wireless communication medium or storage medium, or via a personal computer.

In the above-described embodiment, a case has been explained where the present invention is applied to a projector based on Digital Light Processing (DLP) (registered trademark) technology, which uses semiconductor light-emitting elements as a light source. However, the present invention is not limited to a particular type of light-source elements or projector, and may be applicable to, for example, a projector based on a color liquid crystal panel that uses a high-pressure mercury vapor lamp as a light source.

The present invention is not limited to the above-described embodiments, and can be modified in various manners in practice when implementing the invention, without departing from the gist of the invention. Moreover, the embodiments may be suitably combined, and an effect obtained by the combination may be achieved. Furthermore, the above-described embodiments include various inventions, and a variety of inventions can be derived by suitably combining structural elements disclosed in connection with the embodiments. For example, if the object of the invention is achieved and the advantages of the invention are attained even after some of the structural elements disclosed in connection with the embodiments are deleted, the structure made up of the resultant structural elements can be extracted as an invention.

What is claimed is:

1. A projector apparatus comprising:
   a projection unit that projects an image;
   a projection direction variable unit configured to mechanically change a direction of the image to be projected by the projection unit;
   an acquiring unit that acquires, in an initial setting, a plurality of projection images differing in directions of projection, which are projected by the projection unit onto a target of projection; and
   a control unit that determines a direction of projection to be changed in an actual projection operation by the projection direction variable unit, based on information on the plurality of projection images acquired by the acquiring unit,
   wherein the direction of projection determined by the control unit is a direction of projection corresponding to a projection image in which at least one of a color correction amount and an amount of reduction of an image region is least among the acquired projection images.

2. The projector apparatus according to claim 1, wherein the control unit causes the acquiring unit to acquire projection images in a plurality of directions of projection to be changed by the projection direction variable unit.

3. The projector apparatus according to claim 2, wherein the acquiring unit is a photographing unit that photographs the projection images projected by the projection unit onto the target of projection, or is configured to directly acquire images photographed by an external photographing unit that photographs the projection images projected by the projection unit onto the target of projection via a wired or wireless communication medium or storage medium, or via a personal computer.

4. The projector apparatus according to claim 3, wherein the projection direction variable unit is a projection unit shifter that shifts a direction of projection of the projection unit relative to the apparatus, or a tilt leg driver configured to change an angle of placement of the apparatus by changing a leg length of the apparatus.

5. The projector apparatus according to claim 3, wherein the control unit sets the projection direction variable unit to change the direction of projection to be the determined direction of projection, and sets at least one of a region and color information of the projection image projected by the projection unit to be corrected.

6. The projector apparatus according to claim 2, wherein the projection direction variable unit is a projection unit shifter that shifts a direction of projection of the projection unit relative to the apparatus, or a tilt leg driver configured to change an angle of placement of the apparatus by changing a leg length of the apparatus.

7. The projector apparatus according to claim 6, wherein the control unit sets the projection direction variable unit to change the direction of projection to be the determined direction of projection, and sets at least one of a region and color information of the projection image projected by the projection unit to be corrected.

8. The projector apparatus according to claim 2, wherein the control unit sets the projection direction variable unit to change the direction of projection to be the determined direction of projection, and sets at least one of a region and color information of the projection image projected by the projection unit to be corrected.

9. The projector apparatus according to claim 8, wherein the control unit calculates a direction of projection in which at least one of an amount of reduction of an image region and a color correction amount is least based on the acquired projection images, and determines a corresponding direction of projection to be changed by the projection direction variable unit.

10. The projector apparatus according to claim 1, wherein the acquiring unit is a photographing unit that photographs the projection images projected by the projection unit onto the target of projection, or is configured to directly acquire images photographed by an external photographing unit that photographs the projection images projected by the projection unit onto the target of projection via a wired or wireless communication medium or storage medium, or via a personal computer.

11. The projector apparatus according to claim 10, wherein the projection direction variable unit is a projection unit shifter that shifts a direction of projection of the projection unit relative to the apparatus, or a tilt leg driver configured to change an angle of placement of the apparatus by changing a leg length of the apparatus.

12. The projector apparatus according to claim 10, wherein the control unit sets the projection direction variable unit to change the direction of projection to be the determined direction of projection, and sets at least one of a region and color information of the projection image projected by the projection unit to be corrected.

13. The projector apparatus according to claim 1, wherein the projection direction variable unit is a projection unit shifter that shifts a direction of projection of the projection unit relative to the apparatus, or a tilt leg driver configured to change an angle of placement of the apparatus by changing a leg length of the apparatus.

14. The projector apparatus according to claim 13, wherein the control unit sets the projection direction variable unit to change the direction of projection to be the determined direction of projection, and sets at least one of a region and color information of the projection image projected by the projection unit to be corrected.

15. The projector apparatus according to claim 1, wherein the control unit sets the projection direction variable unit to change the direction of projection to be the determined direction of projection, and sets at least one of a region and color information of the projection image projected by the projection unit to be corrected.

16. The projector apparatus according to claim 15, wherein the control unit calculates a direction of projection in which at least one of an amount of reduction of an image region and a color correction amount is least based on the acquired projection images, and determines a corresponding direction of projection to be changed by the projection direction variable unit.

17. The projector apparatus according to claim 16, wherein the control unit sets a region of the projection image projected by the projection unit to be corrected by trapezoid correction processing.

18. The projector apparatus according to claim 15, wherein the control unit sets a region of the projection image projected by the projection unit to be corrected by trapezoid correction processing.

19. A projection method applied to an apparatus including a projection unit that projects an image, a projection direction variable unit that mechanically changes a direction of the image to be projected by the projection unit, and an acquiring unit that acquires, in an initial setting, a plurality of projection images differing in directions of projection, which are projected by the projection unit onto a target of projection, the method comprising:
    performing control of determining a direction of projection to be changed by the projection direction variable unit, based on information on the plurality of projection images acquired by the acquiring unit,
    wherein the determined direction of projection is a direction of projection corresponding to a projection image in which at least one of a color correction amount and an amount of reduction of an image region is least among the acquired projection images.

20. A non-transitory computer-readable storage medium having a program stored thereon which controls a computer incorporated into an apparatus including a projection unit that projects an image, a projection direction variable unit that mechanically changes a direction of the image to be projected by the projection unit within a predetermined range, and an acquiring unit that acquires, in an initial setting, a plurality of projection images differing in directions of projection, which are projected by the projection unit onto a target of projection, to perform functions comprising:
    a control unit that determines a direction of projection to be changed by the projection direction variable unit based on information on the plurality of projection images acquired by the acquiring unit,
    wherein the direction of projection determined by the control unit is a direction of projection corresponding to a projection image in which at least one of a color correction amount and an amount of reduction of an image region is least among the acquired projection images.

* * * * *